(12) United States Patent
Sethia et al.

(10) Patent No.: US 9,898,409 B2
(45) Date of Patent: Feb. 20, 2018

(54) ISSUE CONTROL FOR MULTITHREADED PROCESSING

(71) Applicant: THE REGENTS OF THE UNIVERSITY OF MICHIGAN, Ann Arbor, MI (US)

(72) Inventors: Ankit Sethia, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 283 days.

(21) Appl. No.: 14/510,482

(22) Filed: Oct. 9, 2014

(65) Prior Publication Data
US 2016/0103715 A1 Apr. 14, 2016

(51) Int. Cl.
| | |
|---|---|
| G06F 9/46 | (2006.01) |
| G06F 12/0844 | (2016.01) |
| G06F 9/45 | (2006.01) |
| G06F 9/50 | (2006.01) |
| G06F 12/0811 | (2016.01) |
| G06F 12/0842 | (2016.01) |
| G06F 9/48 | (2006.01) |

(52) U.S. Cl.
CPC ............ *G06F 12/0844* (2013.01); *G06F 8/45* (2013.01); *G06F 9/4881* (2013.01); *G06F 9/5083* (2013.01); *G06F 12/0811* (2013.01); *G06F 12/0842* (2013.01); *G06F 9/4843* (2013.01); *G06F 2212/1021* (2013.01); *G06F 2212/62* (2013.01); *Y02B 60/144* (2013.01)

(58) Field of Classification Search
CPC .............. G06F 8/45–8/458; G06F 9/46–9/548
See application file for complete search history.

(56) References Cited

U.S. PATENT DOCUMENTS

| 7,536,689 B2 * | 5/2009 | Mangan | G06F 9/4881 718/100 |
|---|---|---|---|
| 9,483,187 B2 * | 11/2016 | Karaje | G06F 9/5027 |
| 2005/0076337 A1 * | 4/2005 | Mangan | G06F 9/4881 718/100 |
| 2006/0179194 A1 * | 8/2006 | Jensen | G06F 9/3859 710/111 |

(Continued)

OTHER PUBLICATIONS

Cazorla, Francisco J. et al., "Dynamically Controlled Resource Allocation in SMT Processors," 2004, pp. 171-182.*

(Continued)

*Primary Examiner* — Thuy Dao
*Assistant Examiner* — Christopher Franco
(74) *Attorney, Agent, or Firm* — Nixon & Vanderhye P.C.

(57) ABSTRACT

A multithreaded data processing system performs processing using resource circuitry which is a finite resource. A saturation signal is generated to indicate when the resource circuitry is no longer able to perform processing operations issued to it. This saturations signal may be used to select a scheduling algorithm to be used for further scheduling, such as switching to scheduling from a single thread as opposed to round-robin scheduling from all of the threads. Re-execution queue circuitry is used to queue processing operations which have been enabled to be issued so as to permit other processing operations which may not be blocked by the lack of use of circuitry to attempt issue.

15 Claims, 5 Drawing Sheets

(56) References Cited

U.S. PATENT DOCUMENTS

Figure 1:
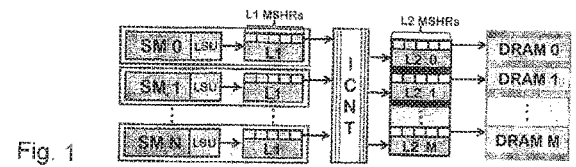

| | | | | |
|---|---|---|---|---|
| 2006/0179281 A1* | 8/2006 | Jensen | ............... | G06F 9/3836 712/214 |
| 2006/0179284 A1* | 8/2006 | Jensen | ............... | G06F 9/3867 712/219 |
| 2006/0236136 A1* | 10/2006 | Jones | ............... | G06F 1/3203 713/300 |
| 2012/0079503 A1* | 3/2012 | Dally | ............... | G06F 9/4881 718/108 |
| 2014/0282579 A1* | 9/2014 | Smiley | ............... | G06F 9/5027 718/104 |
| 2016/0092108 A1* | 3/2016 | Karaje | ............... | G06F 9/5038 718/103 |

OTHER PUBLICATIONS

Snavely, Allan et al., "Symbiotic Jobscheduling with Priorities for a Simultaneous Multithreading Processor," 2002, pp. 66-76.*
Suito, Kazutoshi et al., "The Dependable Responsive Multithreaded Processor for Distributed Real-Time Systems," 2012, pp. 52-61.*
Bechara, Charly et al., "A small footprint interleaved multithreaded processor for embedded systems," 2011, pp. 685-690.*
Sykora, Martino et al., "Dynamic Configuration of Application-Specific Implicit Instructions for Embedded Pipelined Processors," 2008, pp. 1509-1516.*
Jetley, Pritish et al., "Optimizing Multicore Performance with Message Driven Execution: A Case Study," 2011, pp. 1-10.*
J. T. Adriaens, K. Compton, N. S. Kim, and M. J. Schulte. The case for gpgpu spatial multitasking. In *Proceedings of the 2012 IEEE 18th International Symposium on High-Peiformance Computer Architecture*, pp. 1-12, 2012.
R. Ausavarungnirun, K. K.-W. Chang, L. Subramanian, G. H. Loh, and O. Mutlu. Staged memory scheduling: Achieving high performance and scalability in heterogeneous systems. In *Proceedings of the 39th Annual International Symposium on Computer Architecture*, pp. 416-427, 2012.
A. Bakhoda, G. L. Yuan, W. W. L. Fung, H. Wong, and T. M. Aamodt., Analyzing CUDA workloads using a detailed GPU simulator. In *Proc. of the 2009 IEEE Symposium 011 Performance Analysis of Systems and Software*, pp. 163-174, Apr. 2009.
M. Bauer, H. Cook, and B. Khailany. Cudadma: Optimizing gpu memory bandwidth via warp specialization. In *Proceedings of 2011 International Conference for High Performance Computing, Networking, Storage and Analysis*, pp. 1-11, 2011.
S. Che, M. Boyer, J. Meng, D. Tarjan,, J. W. Sheaffer, S.-H. Lee, and K. Skadron. Rodinia: A benchmark suite for heterogeneous computing. In *Proc. of the IEEE Symposium on Workload Characterization*, pp. 44-54, 2009.
S. Che, J. W. Sheaffer, M. Boyer, L. G. Szafaryn, L. Wang, and K. Skaqron. A characterization of the rodinia benchmark suite with comparison to contemporary cmp workloads. pp. 1-11,2010.
G. F. Diamos and S. Yalamanchili. Harmony: an execution model and runtime for heterogeneous many core systems. pp. 197-200, 2008.
W. W. L. Fung, I. Sham, G. Yuan, and T. M. Aamodt. Dynamic warp formation and scheduling for efficient GPU control flow. In *Proc. of the 40th Annual International Symposium on Microarchitecture*, pp. 407-420,2007.
M. Gebhart, D. R. Johnson, D. Tarjan, S. W. Keckler, W. J. Dally. E. Lindholm. and K. Skadron. Energy-efficient mechanisms for man-aging thread context in throughput processors. In *Proc. of the 38th Annual International Symposium on Computer Architecture*, paaes 235-246, 2011.
M. Gebhart, S. W. Keckler, B. Khailany, R. Krashinsky. and W. J. Dally. nifying primary cache, scratch, and register file memories in a throughput processor. Proc. of the 45th Annual International Symposium on Microarchitecture, pp. 96-106, 2012.
A. Hilton, S. Nagarakatte, and A. Roth. iCFP: Tolerating all-level cache misses in in-order processors. *IEEE Micro*, 30(1):12-19, 2010.

A. H. Hormati, M. Samadi, M. Woh, T. Mudge, and S. Mahlke. Sponge: portable stream programming on graphics engines. In *19th Interna-tional Conference on Architectural Support for Programming Lan-guages and Operating Systems*, pp. 381-392, 2011.
A. Jog, O. Kayiran, A. K. Mishra, M. T. Kandemir, O. Mutlu, R. Iyer, and C. R. Das. Orchestrated scheduling and prefetching for gpgpus. In *Proceedings of the 40th Annual International Symposium on Computer Architecture*, pp. 332-343, 2013.
A. Jog, O. Kayiran, C. Nachiappan, A. K. Mishra, M. T. Kandemir, O. Mutlu, R. Iyer, and C. R. Das. Owl: cooperative thread any aware scheduling techniques for improving gpgpu performance. 21th International Conference on Architectural Support for Programming Languages and Operating Systems, pp. 395-406, 2013.
O. Kayiran, A. Jog, M. T. Kandemir, and C. R. Das. Neither more nor less: Optimizing thread-level parallelism for gpgpus. In *Proceedings of the 22ml Illternational Conference on Parallel Architectures and Compilation Techniques*, pp. 157-166, 2013.
S. W. Keckler, W. J. Dally, B. Khailany, M. Garland, and D. Glasco. GPUs and the Future of Parallel Computing. *IEEE Micro*, 31(5):7-17, 2011.
RONOS Group. OpenCL—the open standard for parallel programming of heterogeneous systems, 2010.
NLakshminaraya a, J. Lee, H. Kim, and J. Shin. Dram scheduling pohcy for gpgpu architectures based on a potential function. *Computer Architecture Letters*, 11(2):33-36, 2012.
J. Lee and H. Kim. Tap: A tip-aware cache management policy for a cpu-gpu heterogeneous architecture. Proc. of the 18th International Symposium on High-Petformance Computer Architecture pp. 1-12 2012.
J. Leng, T. Hetherington, A. ElTantawy, S. Gilani, N. S. Kim, T. M. amodt, and V. J. Reddi. Gpuwattch: enabling energy optimizations m gpgpus. In *Proc. of the 40th Annual International Symposium on Computer Architecture*, pp. 487-498, 2013.
C.-K. Luk, S. Hong, and H. Kim. Qilin: exploiting parallelism on heterogeneous multiprocessors with adaptive mapping. In *Proc. of the 42nd Annual International Symposium on Microarchitecture*, pp. 45-55, 2009.
J. Meng, D. Tarjan, and K. Skadron. Dynamic warp subdivision for integrated branch and memory divergence tolerance. In *Proc. of the 37th Annual International Symposium on Computer Architecture*, pp. 235-246, 2010.
V. Narasiman, M. Shebanow, C. J. Lee, R. Miftakhutdinov, O. Mutlu, andY. N. Patt. Improving gpu performance via large warps and two-level warp scheduling. In *Proceedings of the 44th Annual IEEEIACM Intemalional Symposium on Microarchitecture*, pp. 308-317,2011.
J. Power, A. Basu, J. Gu, S. Puthoor, B. M. Beckmann, M.D. Hill, S. K. Remhardt, and D. A. Wood. Heterogeneous system coherence for integrated CPU-GPU systems. In *Proc. of the 46th Annual International Symposium on Microarchitecture*, pp. 457-467, 2013.
T. G. Rogers, M. O'Connor, and T. M. Aamodt. Cache-conscious wave-front scheduling. Proc. of the 45th Annual International Symposium on Microarchitecture, pp. 72-83, 2012.
S. Ryoo, C. I. Rodrigues, S. S. Baghsorkhi, S. S. Stone, D. B. Kirk, and W. mei W. Hwu. Optimization principles and application performance evaluation of a multithreaded GPU using CUDA. In *Proc. of the 13th ACM SIGPIAN Symposium on Principles and Practice of Parallel Programming*, pp. 73-82, 2008.
S. R. Sarangi, W. Liu, J. Tonellas, and Y. Zhou. Reslice: selective re e.xecution of long-retired misspeculated instructions using forward shcmg. In *Proc. of the 38th Annual International Symposium on Microarchitecture*, 2005.
N. Satish, Kim, J. Chhugani, H. Saito, R. Krishnaiyer, M. Smelyanskty,Gtrkar, and P. Dubey. Can traditional programming bridge the nmJa performance gap for parallel computing applications? In *Proceedings of the 39th Annual International Symposium on Computer Architecture*, pp. 440-451, 2012.
S. T.. Srinivasan; R. Rajwar,. H:Akkary, A. Ghandi, and M. Upton. Contmual flow ptpehnes: achtevmg resource-efficient latency tolerance. *IEEE Micro*, 24(6):62-73, 2004.
J. A. Stratton, C. Rodrigrues, I.-J. Sung, N. Obeid, L. Chang, G. Liu, and W.-M. W. Hwu. Parboil: A revised benchmark suite for scien-

(56) References Cited

OTHER PUBLICATIONS tific and commercial throughput computing. Technical report, University of Illinois at Urbana-Champaign, 2012.
S. Thoziyoor, N. Muralimanohar, J. H. Ahn, and N. P. Jouppi. Cacti 5.1. Technical Report HPL-2008-20, Hewlett-Packard Laboratories, Apr. 2008.
NVIDIA, "NVIDIA Cuda C Progamming Guide" Version 4.0, May 6, 2011, 187 pages.
I. Paul et al, "Cooperative Boosting: Needy Versus Greedy Power Management" Proceedings of the $40^{th}$ Annual International Symposium on Computer Architecture, 2013, pp. 1-12.

\* cited by examiner

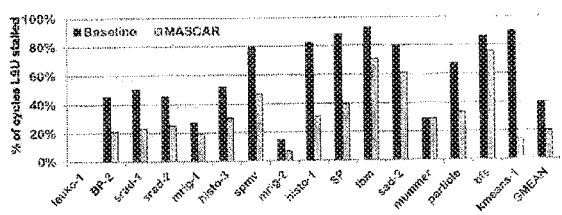
Figure 10: Reduction of LSU stalls when using MASCAR.
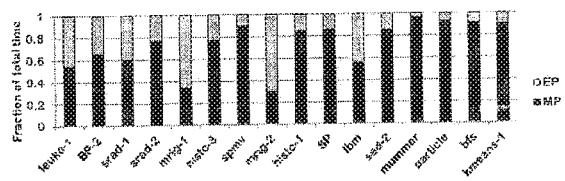
Figure 11: Distribution of execution time spent in Equal Priority (EP) and Memory Access Priority (MP) modes across workloads

Figure 12: Improvement in L1 data cache hit rates.
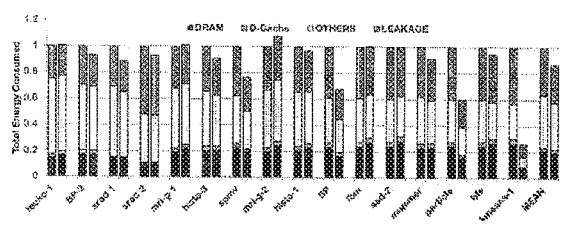
Figure 13: Energy consumption breakdown for baseline (left bar) and MASCAR (right bar, relative to baseline)

ISSUE CONTROL FOR MULTITHREADED PROCESSING

BACKGROUND

This disclosure relates to the field of data processing systems.

Modern processors, such as graphics processing units (GPUs), utilize a high degree of multithreading in order to overlap memory accesses with computation. Using the Single Instruction Multiple Thread (SIMT) model, GPUs group many threads that perform the same operations on different data into warps (group of threads) and a warp scheduler can attempt to swap warps that are waiting for memory accesses for those that are ready for computation. However, programs frequently lack enough computation to hide the long latency of off-chip memory accesses. This is one of the challenges that prevents achieving peak performance on these architectures. When a memory intensive workload needs to gather more data from DRAM for its computations, the maximum number of outstanding requests that can be handled on-chip (including at the L1, L2 and memory subsystem buffers) becomes saturated. Due to this saturation, a new memory request can only be sent when older memory requests complete, and subsequent accesses to the memory can no longer be pipelined resulting in serialized accesses. In such a scenario, the computation portion of any of the parallel warps cannot begin, as all the memory requests needed to initiate the computation have been serialized. Therefore the amount of computation is not sufficient to hide the latency of the unpipelined memory requests to be filed, and the workloads cannot achieve high throughput.

This problem of memory intensive applications saturating memory subsystem resources is exacerbated by uncoalesced memory accesses and irregular access patterns. Such accesses lead to increased cache thrashing, which will force more DRAM memory requests to be issued, thus worsening the serialization of memory accesses. While ideal GPU workloads tend to have very regular, streaming memory access patterns, recent research has examined GPU applications that benefit from cache locality and have more non-streaming accesses. If this data locality is not exploited, cache thrashing will occur causing performance degradation.

SUMMARY

Viewed from one aspect this disclosure provides apparatus for executing a plurality of threads in parallel, said apparatus comprising:
resource circuitry to perform processing operations as part of executing said plurality of threads; and
scheduling circuitry to schedule issue of processing operations from said plurality of threads to said resource circuitry; wherein
said scheduling circuitry is responsive to a saturation signal indicative of a current capacity of said resource circuitry to perform processing operations issued to said resource circuitry to select a scheduling algorithm used to select which of said plurality of threads issue processing operations to said resource circuitry.

Viewed from another aspect this disclosure provides a method of executing a plurality of threads in parallel, said method comprising the steps of:
perform processing operations with resource circuitry as part of executing said plurality of threads; and
scheduling issue of processing operations from said plurality of threads to said resource circuitry; wherein
said step of scheduling is responsive to a saturation signal indicative of a current capacity of said resource circuitry to perform processing operations issued to said resource circuitry to select a scheduling algorithm used to select which of said plurality of threads issue processing operations to said resource circuitry.

Viewed from another aspect this disclosure provides apparatus for processing data comprising:
resource circuitry to perform processing operations as part of executing said plurality of threads; and
issuing circuitry to issue processing operations that use said resource circuitry and re-execution queue circuitry to store data specifying processing operations not able to be issued to said resource circuitry so as to permit further processing operations not requiring use of said resource circuitry to be issued from said issuing circuitry.

Viewed from another aspect this disclosure provides a method of processing data comprising the steps of:
perform processing operations with resource circuitry as part of executing said plurality of threads;
issuing processing operations that use said resource circuitry; and
storing within re-execution queue circuitry data specifying processing operations not able to be issued to said resource circuitry so as to permit further processing operations not requiring use of said resource circuitry to be issued from said issuing circuitry.

The above, and other objects, features and advantages of this disclosure will be apparent from the following detailed description of illustrative embodiments which is to be read in connection with the accompanying drawings.

DRAWINGS

Figure 2:
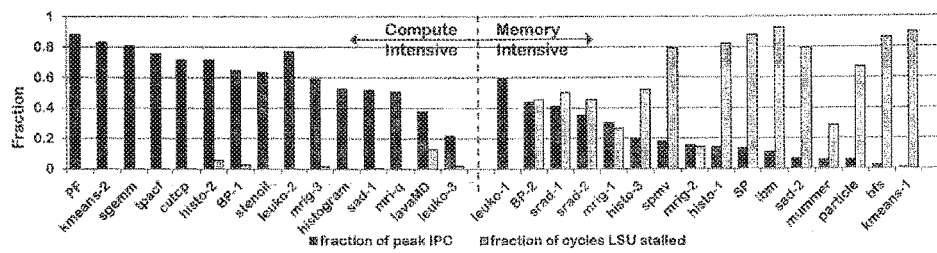
Figure 3:
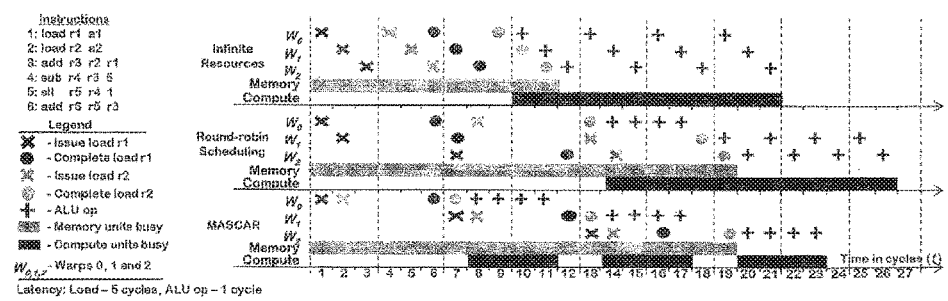
Figure 4:
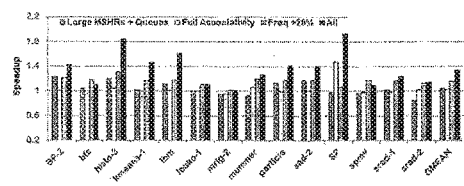
Figure 5:
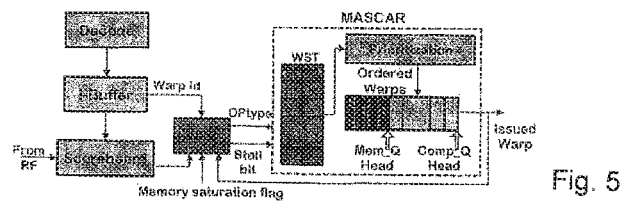
Figure 6:
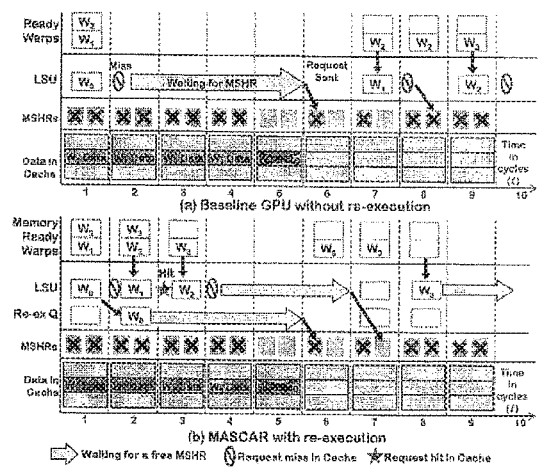
Figure 7:
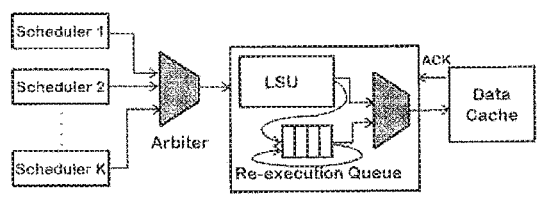

FIG. 1 schematically illustrates a GPU memory hierarchy;

FIG. 2 schematically illustrates the fraction of peak IPC achieved and the fraction of cycles for which an LSU was stalled due to memory subsystem saturation;

FIG. 3 schematically illustrates the execution time line for three systems;

FIG. 4 schematically illustrates the performance impact on memory intensive kernels when increasing the number of MSHRs and sizes of memory subsystem queues, using fully associative L1 and L2 caches, increasing the memory frequency by 20%, and a combination of all three;

FIG. 5 schematically illustrates a memory access scheduler;

FIG. 6 schematically illustrates execution time lines for two systems;

FIG. 7 schematically illustrates a system including a re-execution queue; and

FIGS. 8 to 13 show performance and other characteristic variation for different kernels and scheduling policies.

DESCRIPTION OF EXAMPLE EMBODIMENTS

The warp scheduler present in a GPU's Streaming Multiprocessor (SM) plays a pivotal role in achieving high performance for memory intensive workloads, specifically by prioritizing memory requests from one warp over those of others. While recent work by Jog et al. has shown that scheduling to improve cache and memory locality leads to better performance, the role of scheduling is not limited to workloads which have data locality. Scheduling is also important in improving the performance of many memory intensive workloads that do not exhibit data locality. In the case of compute intensive workloads, varying the scheduling policy has little to no significant impact on performance.

The following discloses Memory Aware Scheduling and Cache Access Re-execution (MASCAR) to better overlap computation and memory accesses for memory intensive workloads. The intuition behind MASCAR is that when the memory subsystem is saturated, all the memory requests of one warp should be prioritized rather than sending a fraction of the required requests from all warps. As the memory subsystem saturates, memory requests are no longer pipelined and sending more requests from different warps will delay any signal warp from beginning computation. As a result, prioritizing requests from one warp allows this warp's data to be available for computation sooner, and this computation can now overlap with the memory accesses of another warp.

While MASCAR's new scheduling scheme enables better overlapping of memory accesses with computation, memory subsystem saturation can also prevent re-use of data with locality in the L1 cache. To ameliorate this, requests stalled in the Load-Store Unity (LSU) due to this back pressure may be moved to a re-execution queue where they will be considered for issuing to the cache at a later time. With such a mechanism, the Load/Store Unit (LSU) is free to process another warp whose requested addresses may hit in the cache. Re-execution can both improve cache hit rates by exploiting such hits under misses, allowing this warp to now execute computation consuming this data as well as reduce back pressure by preventing this warp from having to access DRAM twice for the same data.

This disclosure includes:
Analysis of the interplay between workload requirements, performance, and scheduling policies. The results show that the choice of scheduling policy is important for memory intensive workloads, but has lesser impact on the performance of compute intensive workloads.
A scheduling scheme that allows better overlapping of computation and memory accesses in memory intensive workloads. This scheme limits warps that can simultaneously access memory with low hardware overhead.
A memory instruction re-execution scheme. It is coupled with the Load-Store Unit (LSU) to allow other warps to take advantage of any locality in the data cache when the LSU is stalled due to memory saturation.
An evaluation of MASCAR, on a model of the NVIDIA Fermi architecture achieves, for example, 18% performance improvement over state of the art schedulers for workloads sensitive to scheduling while reducing average energy consumption by, for example, 12%.

Modern GPUs are comprised of numerous streaming multi-processors (SMs, also known as shader cores), each of which are capable of executing unique warps in parallel. FIG. 1 illustrates a high-level view of the hardware considered in this work. The details inside the SM, which include the execution units, register file, etc., have been abstracted as we focus on the memory subsystem of the GTPU. Each SM has a private L1 cache, which uses miss status holding registers (MSHRs) to permit a limited number of outstanding requests, as shown in the figure. The MSHRs are an example of resource circuitry which may not be available when memory intensive processing is performed. All SMs can communicate with a unified L2 cache using the interconnect. The off-chip memory address space is partitioned, and depending on a request's address, it will travel through the interconnect to the corresponding partition. If the request misses in the L2 cache space allocated to this partition, it will go off-chip using a dedicated DRAM channel. Like the L1 cache on an SM, each L2 partition can also handle a fixed number of outstanding memory requests through its MSHRs.

Memory intensive workloads will generate a very large number of memory requests. This typically results in the MSHRs in the L2 filling up much faster than when compute intensive workloads are run. The L2 is then forced to stop accepting requests and sends negative acknowledgements to new requests coming through the interconnect. As the L2 rejects any new requests, the buffers in the interconnect and between the L2 and L1 caches will begin to fill up. When these buffers are full, the interconnect will cease to accept new requests from a SM's L1. Any new request coming from the SM I is allocated a new MSHR at L1, but no new request can be sent to the L2 due to the earlier congestion in the interconnect. The cascading effect of the rejection of memory requests will reach the SM once all of its L1's MSHRs have been reserved. At that point an SM can no longer issue the memory instructions from any ready warp. This results in serialization of all new memory requests as they can only be sent if an earlier request is completed in the memory subsystem, which will free up one of the MSHRs and begin to relieve the back pressure through the rest of the subsystem's resources.

If the LSU begins to stall due to memory back pressure, no warp can access the L1 cache until an MSHR is available. Other warps that need the SM's compute units can still continue execution. If all the memory requests of a warp return before other warps finish executing computational code, then this now ready to execute warp can help to hide the latency of other warps whose memory requests have not yet retuned. However, due to the serialization of memory accesses the amount of computation required to mask the remaining memory latency is significantly higher than the amount required when the requests are pipelined.

This disclosure provides an architecture that uses two warp schedulers per SM, similar to that of the NVIDIA Fermi architecture. Each scheduler chooses the next warp to be executed on the basis of a scheduling policy. We use round robin warp scheduling as the baseline policy. In this policy, one warp from the pool of warps that are ready to execute is selected for execution in a round-robin fashion.

To identify data parallel application kernels that suffer due to the memory subsystem back pressure issues described above. We classify kernels from the Rodinia benchmark suites as compute or memory intensive. For each of these kernels, FIG. 2 shows the fraction of the theoretical peak IPC (instructions per cycle) achieved (left bar) and the fraction of the theoretical peak IPC achieved (left bar) and the fraction of cycles for which the SM's LSU is forced to stall (right bar) due to memory subsystem saturation (the methodology for this work is detailed in below). The kernels are considered to be compute intensive if the number of instructions executed on an SM per L1 cache miss is greater than 30, otherwise it is considered to be memory intensive. The kernels are arranged in decreasing order of their fraction of peak IPC achieved within their category.

Of the 31 kernels in the two benchmark suites, 15 are in the compute intensive category whereas 16 are considered memory intensive. While 13 out of 15 kernels in the compute intensive category achieve more than 50% of the peak IPC for compute intensive kernels, only 1 out of the 14 kernels in the memory intensive category achieves 50% of the peak IPC. In fact, 9 kernels achieve less than 20% of the peak performance in this category, whereas no kernel in the compute intensive category suffers from such low performance. FIG. 1 illustrates a strong correlation between the memory demands of GPU work loads and the performance they achieve.

When examining the impact of memory subsystem back pressure on these applications, it is observed that compute intensive kernels rarely cause stalls in the LSU. This results in the timely processing of memory request required to initiate their computation. On the other hand, the memory intensive kernels show a significant rise in the number of LSU stall cycles due to growing back pressure in the memory subsystem. This stalling hampers the GPUs ability to overlap memory accesses with computation. The percent of LSU stall cycles seen in FIG. 2 for the memory intensive workloads is indicative that these workloads struggle to achieve peak throughput primarily due to saturation of the memory subsystem.

Warp scheduling can have a significant impact on how many memory accesses can be overlapped with computation. FIG. 3 shows execution timelines for an example workload with three warps run on three architectures. For the sake of simplicity, in this example, it is assumed that each arithmetic instruction takes one cycle, load instruction takes five cycles and that there are three warps that can execute in parallel. In this miniature system, only one warp can issue an arithmetic or memory operation per cycle. The example workload is shown on the left in of FIG. 3. In this workload, the first compute operation occurs on line 3 and it cannot begin until both of the loads finish execution. The top timeline illustrates theoretical GPU hardware that has infinite bandwidth and MSHRs, and uses a round robin warp scheduler. The second timeline shows the execution for system with support for two outstanding memory requests and also uses round-robin scheduling. The final timeline demonstrates how MASCAR's scheduling works with hardware that supports outstanding requests.

Infinite resources: when the system has infinite resources with round-robin scheduling, the load for r1 is launched for each of the three warps over three consecutive cycles. At t=4, the load unit is ready for the next load instruction, so the load for r2 gets issued for all three warps in a similar fashion. After five cycles, the load for r1 for W0 returns, and because there were enough MSHRs and the memory requests were fully pipelines, the loads for r1 for W1 and W2 complete in the next two cycles. At t=9, the load for r2 returns and the computation can finally begin for W0 in the next cycle. This computation is completed by t=13. As only one warp's instruction can be executed per cycle, the computation for all three wraps takes 12 cycles for the workload's four add instructions due to round-robin scheduling. This theoretical system finishes execution in 21 cycles for this synthetic workload.

Round-robin with two outstanding requests: The performance of this system is hindered due to it only supporting a limited number of outstanding memory requests. The first two cycles behave similar to the infinite resource case, but in the third cycle, the memory request cannot reserve an MSHR and this has to wait to be sent to memory until one of the first two request returns. As the first request comes back at t=6, W2's load for r1 may be issued at t=7. At t=8, W0's load for r2 is issued, delaying computation until their load completes at t=14. This computation can hide the memory access of W1 and W2's loads of r2. These loads r2 return one after another t=18 and t=19. The computation for both of the warps takes 10 cycles to complete as only one warp can execute per cycle in round-robin fashion. The overlap of memory accesses with computation is shown by the bands for memory and compute, respectively. It can be seen that the compute operations are ineffective in hiding any memory accesses until t=13 as none of the data required by any warp is available. The execution of this workload finishes at t=26, five cycles later than the theoretical system with the infinite MSHRs.

MASCAR with two outstanding requests: Whenever MASCAR detects memory subsystem saturation, rather than selecting instructions from warps in a round-robin fashion, it prioritizes memory requests of a single warp. In the illustrated example, the workload has been running for some time such that saturation occurs at t=1 and t=2. No other memory requests can be sent as the system can only handle two outstanding requests at a time. When the data returns for the first load at t=6, W1 is given priority to issue its memory requests for load of r1 in the next cycle. At t=7, W0's memory request for the load for r2 returns and the warp is now ready for execution/W0's computation can begin simultaneously with W1 's next memory request at t=8. This computation from cycles 8 to 11 completely overlaps with memory accesses, which was not possible when using the round-robin scheduler in either of the previously mentioned architecture. Similarly, the computation for W1 begins at t=14 and overlaps with memory access until it completes at t=17. The program finishes execution at t=23 and due to the increased overlap of computation with memory access, the workload running on MASCAR finishes earlier than the traditional scheduler.

One way to resolve memory resource saturation is to provision the memory subsystems with more resources to handle such demands. To model this, memory intensive kernels were run on a simulator modelling a NVIDIA Fermi GTX 480 GPU modified to have a) a large number of L1 and L2 MSHRs and large queues throughout the subsystem (all sized 102420); b) fully associative L1 and L2 caches; c) increasing the memory frequency by 20%; and d) a combination of (a), (b), and (c). FIG. 4 shows the performance improvements achieved over an unmodified GTX 480 when using these extra provisions.

While a combination of all of these improvements yields decent speedups for some workloads and modest results for others (geomean of 33% speedup), such a system is extraordinarily hard to realize. Adding MSHR's is very costly due to the complexity of the necessary content-addressable memories. Searching through a fully associative cache's tag array bandwidth is not scaling as quickly as GPU computational throughput, and increasing the frequency will also exacerbate issues of GPU energy consumption and thermal power dissipation. As provisioning GPU's with additional or faster memory resources is prohibitive, the follow will focus on better overlapping memory accesses with computation through a new warp scheduling scheme and minimal hardware additions.

To ameliorate the impact of back pressure on memory intensive workloads, MASCAR provides two modes of scheduling between wraps. The first mode, called the Equal Priority (EP) mode, is used when the memory subsystem is not saturated. In this case, MASCAR follows the SM's traditional warp scheduling scheme where all warps are given equal priority access to the memory resources. However, if the memory subsystem is experiencing heavy back pressure, the scheduler will switch to a Memory Access Priority (MP) mode where one warp is given priority to issue all of its memory requests before another warp can do so. The goal of giving one warp the exclusive ability to issue its requests when scheduling in MP mode is to schedule warps to better overlap computation and memory accesses. By doing so, MASCAR is able to reduce the impact of performance bottlenecks caused by saturation of resources in the memory subsystem. As discussed above, round-robin scheduling permits all warps to issue some of their memory requests, but none can continue with their execution until all of their requests are filled. This also holds true for state of the art schedulers, e.g. GTO. To prevent this from occurring, MASCAR's MP mode gives one warp priority to issue all of its requests while other warps may wait, which makes all of the prioritized warp's data available for computation sooner than in conventional scheduling approaches. As this warp can now compute on its data, another warp can be given priority to access memory, thus increasing the likelihood that computational resources are used even as many other warps wait on their data. Further details regarding MASCAR's scheduling modes are provided below.

The detection of memory subsystem saturation is accomplished by a signal from the SM's L1 cache, called the memory saturation flag. The details of the logic used to determine the flag's value are explained below. Once this back pressure signal is asserted, the SM switches scheduling from EP to MP mode. If the back pressure is relieved over time, the saturation flag will be cleared and MASCAR switches the scheduler back to EP mode, allowing for rapid and simple toggling between MASCAR's two modes of scheduling.

To exploit data locality that might be present, MASCAR couples a re-execution queue with the LSU. By providing a means for warps to access the L1 data cache while other memory resources are saturated, this queue allows an SM to exploit hit under miss opportunities as warps with accesses that might hit in the L1 can run ahead of other stalled or waiting accesses. If the access misses in the L1 and back pressure has built up throughout the system's memory resources such that it cannot reserve an MSHR, the request is pushed onto the re-execution queue and its access will be retried at a later time. This reduces the delay a warp incurs between accessing data present in the L1 and when the warp can start computation. The description below provides implementation details and an example of MASCAR's cache access re-execution in action.

In the baseline SM, after an instruction is decoded it is put into an instruction buffer. Once the instruction is at the head of this buffer and its operands are ready, the scheduler will add the instruction's warp to a queue of ready warps according to its scheduling policy. MASCAR alters this step by gathering these warps into separate memory-ready and compute-ready warp queues as shown in FIG. 5. This allows MASCAR (scheduling circuitry) to give priority to one memory-ready warp to issue to the LSU and generate its memory requests while stalling all other warps waiting on this resource.

Identifying the memory warp to issue: To track which memory-ready warp should be issued to the LSU, MASCAR uses a Warp Status Table (WST) that stores two bits of information per warp. The first bit indicates whether a warp's next instruction will access memory, and the second tells the scheduler to stall issuing of the warp's instruction.

The state of a warp's bits in the WST are determined by the Warp Readiness Checker (WRC). To set a WST entry's memory operation bit, the WRC simply examines the instruction buffer to determine whether or not each warp's next instruction will access memory and sets the bit accordingly. To set a stall bit in the WST, the WRC may first determine which warp is given exclusive ownership and access to the LSU. This warp is called the owner warp, and the details of managing ownership are described below. If a warp's next instruction needs to access memory but it is not the owner warp, the WRC sets its stall bit in the WST. A warp's stall bit will also be set if the scoreboard indicates that an operand needed by that warp's memory or compute instruction is not ready. If a new warp is granted ownership, the stall bits are updated according to the aforementioned process. If during execution the memory back pressure is relieved and the scheduler switches from MP back to EP mode, all stall bits are cleared.

Owner warp management: The owner warp continues to issue all of its memory requests through the LSU as memory resources become available. It does so until it reaches an instruction which is dependent on one of the issued loads. At this point it relinquishes its ownership. In order to identify when an operation is dependent on a long latency load, each scoreboard entry is augmented with one extra bit of metadata to indicate that its output register is the result of such an instruction. The WRC, shown in FIG. 5, requests this dependence information from the scoreboard for each instruction belonging to the owner warp, and the scoreboard finds the disjunction of all this new metadata for this instruction's operands. When the WRC is informed that the owner warp's instructions are now waiting on its own loads, the WRC relieves this warp of ownership and resets all other warps' stall bits in the WST. Now that all warps are free to issue to memory, one will go ahead and access memory. If the memory saturation flag remains asserted and the scheduler remains in MP mode, this warp will become the new owner.

Warp prioritization: MASCAR prioritizes warps into two groups. The first group is for warps that are ready to issue to the arithmetic pipeline and are called compute-ready warps. Conversely, the second group of warps are called memory-ready warps, and are warps which are ready to be issued to the memory pipeline. These groups are illustrated by the unshaded and shaded regions, respectively, of the ordered warps queue shown in FIG. 5. When scheduling in MP mode, compute-ready warps are given priority over memory-ready warps to allow a maximum overlap of computation with memory accesses during periods of heavy back pressure in the memory subsystem. Within these groups, the oldest warp will be scheduled for issue to their respective pipelines.

Once MASCAR switches from EP to MP mode, warps that do not have ownership status will no longer be able to issue memory instructions to the LSU. However, earlier instructions from such warps might already be present in the memory-ready warps queue. If MASCAR does not allow these warps to issue, the owner warp's memory instructions will not be able to reach the head of the queue, preventing forward progress. To address this potential bottleneck, MASCAR allows these non-owner, memory-ready warps to issue to the L1 data cache. If a non-owner's request hits in the L1, its data returns, and the instruction can commit. Otherwise, the L1 will not allow this non-owner's request to travel to the L2, and instead returns a negative acknowledgement. MASCAR informs the L1 which warp has ownership, allowing the L1 to differentiate between requests from owner and non-owner warps. Negative acknowledgements may still cause the LSU to stall when non-owner warps get stuck waiting for data to return, but MASCAR overcomes this limitation with cache access re-execution, described in Section 3.3.

Multiple schedulers: MASCAR's scheduling in MP mode allows one warp to issue its memory accesses at a time, but modern NVIDIA GPU architectures like Fermi and Kepler have multiple warps schedulers per SM and are capable of issuing multiple warps' instructions per cycle. To ensure that each scheduler does not issue memory accesses from different warps when MP mode is in use, the WRC shares the owner warp's information with all schedulers present in an SM. Now, the scheduler that is handling an owner warp's instructions will have priority to issue its memory instructions to the LSU during periods of memory subsystem saturation, while any scheduler is free to issue any warp's computation instructions to their respective functional units.

Memory subsystem saturation detection: The memory saturation flag informs MASCAR's scheduler of memory back pressure. This flag is controlled by logic in the SM's L1 cache.

The L1 cache has a fixed number of MSHRs as well as entries in the miss queue to send outstanding request across the interconnect. If either structure is totally occupied, no new request can be accepted by the cache that needs to send an outstanding request. Therefore, whenever these structures are almost full, the L1 cache signals to the LSU that the memory subsystem is saturating. The LSU forwards this flag to MASCAR's scheduler so that it toggles to MP mode. The cache does not wait for these structures to completely fill as once this occurs, the owner warp will not be able to issue any requests.

Instrumenting the L1 cache with this saturation detection is good as the L1 is located within the SM. Doing the same at the L2 requires information to travel between the L2 partitions and the SM, likely through the interconnect, which will incur more design complexity and delay MASCAR's scheduler from shifting to MP mode in a timely manner. Detecting back pressure at the L1 is quicker and more cost-effective, and as the effects of saturation travel backwards from the L2 to the SMs' L1 s it is just as valid to detect saturation at these caches.

Benchmarking shows that global memory accesses are the dominant cause of back pressure. However, for certain workloads, texture or constant memory accesses are major contributors to saturation. MASCAR also observes saturation from these caches. In all of our benchmarks' kernels, only one of the three memory spaces causes saturation at a given time.

There are two major differences between scheduling in EP and MP modes. The first difference is that in EP mode all warps have equal priority to issue memory requests. The second is that in MP mode, compute warps are prioritized to do as much computation as possible when the memory is saturated, whereas in EP mode the memory warps are prioritized over computation warps. This is done to send out as many memory requests as possible to maximize the utilization of the memory subsystem. If an SM is in EP mode, the workload is balanced in such a way that that the memory subsystem is not saturated and, because of this, it should have enough computation to hide the latency of all the pipelined memory requests.

When the memory subsystem becomes saturated with requests, the L1 data cache stops accepting new requests from the SM's LSU. At this point, the LSU is stalled and cannot process any new requests. When a memory request returns from memory and an MSHR is freed, the LSU can issue a new request to the L1. During this time, another warp whose data may be available in this cache cannot progress with its computation as the LSU is stalled. If this warp was able to access the L1 and retrieve its data, it could have helped hide the latency of other memory accesses with its own computation. An example of this situation is illustrated in FIG. 6(a) for the theoretical device depicted in FIG. 3 with round-robin scheduling and a load instruction latency of five cycles if the data is not present in the cache. While W0 is stalled in the LSU as no MSHRs are available in the L1, W1 and W2 are ready to access memory but cannot be issued. During this stall, W1's data is actually available in the cache, but at t=5 this data gets evicted when a previous request completes. After W0's request gets sent to global memory, W1 misses in the L1 and may reload its data from the L2/global memory. If there was some mechanism in place to enable a hit under miss while the MSHRs were occupied, W1 could have gone ahead with its memory request to the cache, accessed the required data and started computation, all without needing to reload its data.

When the LSU stalls, warps with memory requests that might hit the L1 cache are served with their data much later. If this delay is too long, there is a chance that what may have been hit in the L1 will become a miss as another request might return from the L2/DRAM and evict this request's data. This effect is exacerbated due to the limited size of the data cache, for which 1536 threads share up to 48 KB of L1 data cache in modern architectures.

To address this issue and take advantage of hits under misses, we propose to add a cache access re-execution queue (re-execution queue circuitry) alongside the LSU as shown in FIG. 7. Whenever a request stalls in the LSU, the generated address and associated metadata is removed from the head of the LSU's pipeline and is pushed onto the re-execution queue, freeing the LSU to process another request. If the newly processed request misses in the L1 cache, it is also added to this queue. Otherwise, if the next request hits in the cache that warp can commit its memory access instruction and continue execution.

Requests queued for re-execution are processed if one of two conditions are met. First, if the LSU is not stalled and has no new requests to process, it can pop a request from the re-execution queue and send it to the L1. Second, if the re-execution queue is full, the LSU is forced to stall as it cannot push more block requests into this queue. If this occurs, the LSU only issues memory requests from its re-execution queue. New memory instructions can only be issued to the LSU once entries in the re-execution queue are freed and the LSU is relieved of stalls. Address calculation need not be repeated for queued accesses, as this was already done when the request was first processed by the LSU. MASCAR only allows one memory instruction per warp to be pushed to the re-execution queue at a time. This is to ensure that if a store is followed by a load instruction to the same address, they are serviced in sequential order. As the GPU programming model has weak memory consistency semantics, ensuring the above requirement is sufficient for maintaining consistency. As an instruction from a warp may generate several memory requests when accesses are uncoalesced, each request is given a unique entry in the re-execution queue.

It has been shown that for cache sensitive kernels, intra-warp locality is more important than inter-warp locality. Therefore, it is important for warps to consume the data they request before it gets evicted from the cache. By prioritizing one warp's requests over others, MASCAR allows one warp to bring its data to the L1 and perform computation upon it before it is evicted by another warp's data.

MASCAR's cache access re-execution also provides an opportunity to service hits under misses while the owner warp is waiting for MSHRs to issue its memory requests. While a system with more MSHRs provides warps with more opportunities to access the cache, having more MSHRs can also worsen cache thrashing. Without increasing the size of an already small L1 cache, adding support for more outstanding requests may force some of these requests to evict data that would have soon been reused. Rather than provide more MSHRs, we propose an in-order re-execution queue, which permits hit under miss without sending new requests to the L2/DRAM for non-owner warps. Our results show that a 32 entry re-execution queue satisfies the memory demands of our benchmarks' kernels. This design incurs less overhead than adding 32 MSHRs per SM as the complexity of a larger associative MSHR table is avoided, and prevents the aforementioned cache thrashing scenarios from occurring.

The impact of coupling a re-execution queue with the LSU is illustrated in FIG. 6(*b*). To demonstrate a simple example, this queue only has one entry. At t=0, W0 gets issued to the LSU, and because the MSHRs are full it is moved to the reexecution queue at t=2. Now, W1 is issued to the LSU, before a prior request evicts its data from the cache as had occurred in FIG. 6(*a*). By moving W0's request to the re-execution queue, W1 can now go ahead and access the L1, where it experiences a hit under W0's miss. Having obtained its data, W1's memory instruction can commit, allowing W2 to issue to the LSU. As the re-execution queue is full and W2 misses in the L1 at t=4, the LSU is forced to stall. However, as W1 finished its load, the SM is able to perform useful computation on that data while W0 and W2 await an MSHR. Furthermore, as W1's memory instruction was serviced and hit earlier, better utilization of the MSHRs is possible, allowing W3 to be issued to the LSU earlier than in the baseline system. By exploiting hit under miss opportunities when using a re-execution queue, warps are able to bypass other warps that normally would block access to the L1, permitting more reuse of data in the cache.

The impact of re-execution on a memory subsystem experiencing back pressure is important. The system should ensure that re-execution does not interfere with MP mode scheduling as re-execution can send requests to the L2/global memory for any warp, not just the owner. MASCAR resolves this at the L1 by preventing misses from non-owner warps from accessing the next level cache. As described above, MASCAR provides the L1 with knowledge of which warp holds ownership when MP mode is active. If a non-owner warp's request is sent from the queue to the L1 and misses, the L1 returns a negative acknowledgement and this request is moved from the queue's head to its tail. Otherwise, if this request belonged to an owner warp and enough resources were available to send the request across the interconnect to the L2/DRAM, it would send this request to get its data. If an owner warp's request missed in the L1 and could not be sent to the L2/DRAM, the request would also be moved to the re-execution queue's tail. This recycling of requests, as shown in FIG. 7 ensures that the owner warp can make forward progress when its requests are in the middle of the queue.

If a warp relinquishes ownership and the scheduler's memory-ready warps queue is empty, the warp of the request at the head of the re-execution queue is given ownership and can now send requests to the L2/DRAM.

The following uses GPGPU-Sim to model the baseline NVIDIA Fermi architecture (GTX 480) and the MASCAR extensions. The simulator parameters that were used to gather data are shown in Table 1. All of the benchmarks, shown in Table 3, come from the Rodinia and Parboil benchmark suites. The last column in Table 3 shows the number of instructions executed by the SM per miss in the L1 cache. Benchmarks that exhibit a ratio of instructions executed per L1 miss of greater than 30 are considered compute intensive and are markedC in the type column, and others are marked M for memory intensive. GPUWattch is used to estimate the power consumed by these applications for both the baseline and MASCAR-enabled GTX 480 devices.

Three hardware structures are added to the baseline SM to implement MASCAR's modifications. Table 2 shows the per SM overheads of these structures. To support scheduling requirements for MP mode, the Warp Status Table (WST) stores two status bits for each warp. As the Fermi architecture supports a maximum of 48 warps per SM, the WST requires 12 bytes of storage. The Warp Readiness Checker (WRC) stores the current owner warp's ID in a six bit field, and uses simple, single bit boolean logic to determine the stall bit.

To support MASCAR's cache access re-execution, each re-execution queue entry stores 301 bits of information. This includes the request's base address (64 bits), each thread's byte offset into this segment (224 bits—7 bit 128B segment offset_ 32 threads), and bits to identify the warp (6 bits) this request belongs to and its destination register (7 bits). A sensitivity study discussed below found that 32 entries were sufficient to expose ample hit under miss opportunities, making the queue 1216 bytes in size. Comparing the queue to each SM's 64 KB L1 data cache/shared memory using CACTI 5.3, we find that the queue's size is just 2.2% of that of the cache and that a queue access uses 3% of the energy of an L1 access which is a small component of the overall energy consumption.

Figure 8:
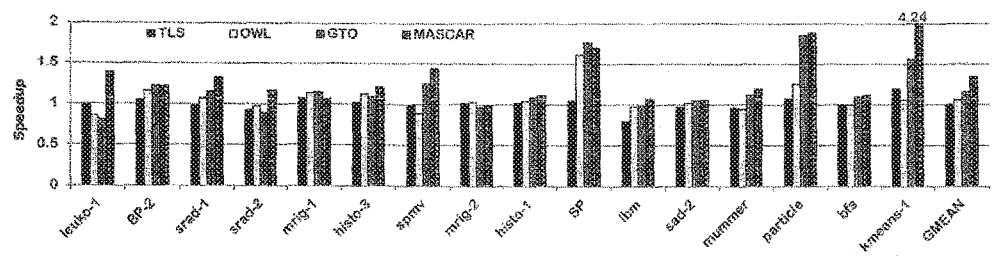

Performance Improvement: FIG. 8 shows the speedup achieved for memory intensive kernels when using four warp scheduling schemes with respect to a round-robin scheduler. We compare MASCAR with two-level warp scheduling (TLS) by Narasiman et al., OWL by Jog et al., and Greedythen-Oldest (GTO) scheduling provided with GPGPU-Sim.

TLS2 (Using the TLS implementation available in GPGPU-Sim V3.2.2) scheduling does not show significant improvement over the baseline. TLS attempts to overlap computation with memory access by staggering warp execution so that some warps perform computation while others execute memory operations. Modern GPU architectures, however, allow enough warps per SM to naturally generate an equivalent or better overlapping. Furthermore, newer GPUs also have an L1 data cache that allows intermittent hits in the cache, reducing memory back pressure. For these reasons, TLS generally sees little benefit across memory intensive workloads, only achieving a geometric mean speedup of 1.5%.

OWL scheduling tries to reduce cache contention by prioritizing sub-groups of warps to access cache in an attempt to give high-priority sub-groups a greater chance to reuse their data. OWL is effective for several workloads that are sensitive to this prioritization, such as BP-2, mrig-1, histo-3, SP and particle. However, not all memory intensive workloads have data locality. Even for cache sensitive kernels, OWL is not as effective as reported for the older GTX 280 architecture due to improvements in our Fermi baseline. Prior work has shown that preserving inter-warp data locality is more beneficial when improving the hit rate of the L1 data cache. Furthermore, the scoreboarding used in modern architectures allows a warp to reach an instruction reusing cached data much faster. This automatically enables higher reuse of data in the cache. Overall, OWL scheduling shows 6% performance improvement over the baseline. We do not implement OWL's memory-side prefetching as it is orthogonal to our work and is applicable for any scheduling scheme.

GTO shows significant improvements in performance over the baseline. GTO focuses on issuing instructions from the oldest warp, permitting this one warp to make more requests and exploit more intra-warp data reuse. This greedy prioritization allows GTO to achieve a geometric mean speedup of 16%. However, GTO swaps warps whenever the executing warp stalls for the results of long latency operations, allowing memory accesses to be issued by more than one warp. Therefore, GTO still suffers from issuing requests for multiple warps' loads, resulting in a longer delay before any single warp is ready for computation which is addressed by MASCAR.

Overall, MASCAR achieves a significant geometric mean speedup of 34% for the memory intensive workloads shown in FIG. 8. MASCAR performs better than or almost equal to all other scheduling schemes except for mrig-1 and mrig-2. These kernels have brief phases of high memory intensity, and the memory back pressure in these phases is relieved before these benchmarks can benefit from MASCAR. Speedups for leuko-1, histo-3, SP, lbm, and both srad kernels are mainly attributed to scheduling warps in MP mode. On top of MASCAR's MP mode scheduling, spmv, mummer, particle, bfs, and kmeans-1 experience higher hit rates due to cache access re-execution, which further boosts their performance.

Figure 9:
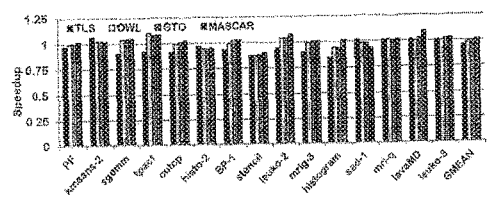

The choice of scheduling policy has much less of an impact on the performance of compute intensive workloads, as seen in FIG. 9. All scheduling policies again are compared to roundrobin scheduling. TLS, OWL, and GTO are within 4%, 1%, and 0.5% of the baseline's performance. Overall, MASCAR achieves a 1.5% geometric mean speedup for these workloads. Occasionally, short phases in compute intensive workloads suffer from memory saturation, and MASCAR can accelerate these sections. Leuko-2, lavaMD, and histogram are examples of such workloads. Leuko-2's initial phase exhibits significant pressure on the memory system due to texture accesses, which MASCAR's MP mode alleviates. LavaMD and histogram behave similarly but with saturation due to global memory accesses. MASCAR does cause performance degradation compared to the baseline scheduling for histo-2, stencil and sad-1, but these slowdowns are not significant.

Microarchitectural impacts of MASCAR: MASCAR's scheduling and re-execution have a significant impact on the fraction of cycles for which the LSU stalls. These stalls were discussed above. FIG. 10 shows that MASCAR is capable of reducing these stalls on average by almost half, from 40% down to 20%. By alleviating these stalls, MASCAR more efficiently brings data to the SM and overlaps accesses with computation. The most significant impacts can be seen for spmv, SP, particle and kmeans-1, which correlates with their significant speedups in FIG. 8. Because compute intensive workloads stall the LSU far less frequently than memory intensive applications, we do not show these figures.

Depending on the severity of memory intensity, MASCAR's scheduler will be in either EP or MP modes for different durations of time as shown in FIG. 11. There is a direct correlation between the number of cycles a workload is in MP mode to the number of cycles the LSU is stalled for the baseline scheduler used in FIG. 2. Leuko-1, srad-1, mrig-1, mrig-2 and lbm are workloads that spend some time in both modes and exhibit phased behavior with intermixed periods of compute and memory intensity. As previously described, mrig-1 and mrig-2 spend most of their time in EP mode and their MP mode phases are so short that the benefits of MASCAR are muted for these benchmarks. Severely memory intensive workloads, including kmeans-1, bfs, particle, mummer, and SP, operate in MP mode for 85%-90% of their execution.

The impact of the re-execution queue proposed above illustrated by the improvements in L1 hit rates shown in FIG. 12. This shows results for the five workloads that have complex reuse patterns. The data also compares MASCAR with CCWS. The CCWS simulator provided by Rogers et al. was used (modified to match our baseline GTX architecture) which is designed specifically for highly cache sensitive kernels. They do not show improvement for cache insensitive memory intensive kernels, so the present analysis focuses on these five kernels. While CCWS achieved better hit rates than MASCAR for all but one of the kernels as it reduces the number of warps that can access the data cache to preserve locality, MASCAR's hit rate improvements are close to CCWS for the majority of the kernels. Because the number of requests going to DRAM are significantly reduced, the exposed memory latency is reduced such that it better overlaps with computation. The resulting exposed latency can be effectively hidden by both CCWS and MASCAR such that MASCAR is on average within 2% of the performance achieved by CCWS. However, CCWS's victim tags incur more hardware overhead than MASCAR, which has a design complexity that can induce a higher energy overhead while not improving the performance of cache insensitive kernels.

A sensitivity study of the impact of the size of the re-execution queue on performance of the cache sensitive kernels was performed. For all kernels except kmeans-1, a 16 entry reexecution queue is sufficient to expose greater reuse. Kmeans-1 has a significant number of uncoalesced accesses, and requires more entries as each uncoalesced access breaks down into multiple requests. Overall, the performance of the kernels saturates with 32 entries, and hence was chosen for our design.

Improvement in Energy Efficiency: MASCAR's impact on energy efficiency for memory intensive workloads was investigated, and found that its speedups obtained due to scheduling and re-execution leads to energy savings. This effect can be seen in FIG. 13, where each workload's left and right bar represent the energy consumed by the baseline and the MASCAR architectures, respectively. On average, MASCAR reduces energy consumption by 12% compared to the baseline system. The following breaks these energy figures down into four components (DRAM, L1 data cache, leakage and others, which includes the interconnect, SM pipelines, and L2 cache) to analyze MASCAR's energy efficiency. All components are normalized with respect to the total energy consumed when run on the baseline.

The results examine DRAM energy as MASCAR scheduling allows significant lower activity in the DRAM when it operates in MP mode. The data cache energy is studied to see how cache access re-execution impacts this component. As MASCAR's significant speedups permit benchmarks to finish earlier, the leakage energy will be reduced as the device operates for fewer cycles, so these energy figures are reported.

For most workloads, DRAM energy consumption is unchanged. However, kmeans-1, particle, and spmv show noticeable reductions due to higher L1 hit rates preventing DRAM reads. Their gains, however, are offset by the increased DRAM energy consumption of srad-2, mrig-2, and lbm. Jog et al. discuss how consecutive thread blocks access the same DRAM row. MASCAR sometimes reduces row locality by allowing all of one warp's requests to go to DRAM, forcing other warps to reopen previously used rows.

The data cache's energy consumption is slightly reduced as MASCAR exploits hit under miss opportunities, reducing failed access attempts. This indicates that the energy impact of re-executing cache accesses is not significant. The other components exhibit a 3.5% decrease in energy, primarily due to reduced interconnect traffic in MP mode. The greatest contribution to energy savings, in this example, is due to the savings in leakage energy, which improved by 7% on average. As workloads were able to make quicker progress during phases of heavy memory saturation, they finished earlier, thus reducing the leakage power consumed.

The above examples have been described in relation to constraints arising due to finite resources for supporting memory accesses. It will be appreciated that the techniques of dynamically and adaptively selecting a scheduling algorithm in response to a saturation signal and the use of a re-execution queue can be applied more generally. The resource circuitry could have other forms, such as, for example, the storage capacity of a cache memory as distinct from the miss tracking circuitry (MSHRs). The particular forms of scheduling algorithm between which a change is made or a single scheduling algorithm the parameters of which are changed, can take a variety of forms. It may be appropriate in some embodiments to wait until the resource circuitry is fully saturated and then switch to a scheduling algorithm which only permits scheduling from a single thread. In other embodiments the saturation signal may be an indication of when the resource circuitry is becoming heavily used, but not yet fully saturated, and this can be used to control switching to a different sort of scheduling algorithm, for example one which selects from a subset of two or more of the threads rather than from all of the threads in an effort to ease the burden upon the resource circuitry.

While the above techniques have been described in relation to warp processing (groups of threads executing a common program upon different data), the techniques may find use outside of this application in relation to more general multithreaded operation where the threads can excessively compete for resources. While the above has described a system which employs both scheduling algorithm selection based upon a saturation signal and the use of a re-execution queue, it will be appreciated that these two aspects may be used independently of each other as well as I combination with each other. Used in combination these two aspects of the disclosure provide a synergy which yields particular improvements as described above.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A method of executing a plurality of threads in parallel, said method comprising:
    perform processing operations with resource circuitry as part of executing said plurality of threads;
    scheduling issue of processing operations from said plurality of threads to said resource circuitry;
    issuing processing operations that use said resource circuitry with issuing circuitry; and
    storing data specifying processing operations not able to be issued to said resource circuitry with re-execution queue circuitry so as to permit further processing operations not requiring use of said resource circuitry to be issued from said issuing circuitry; wherein:
    said step of scheduling is responsive to a saturation signal indicative of a current capacity of said resource circuitry to perform processing operations issued to said resource circuitry to select a scheduling algorithm used to select which of said plurality of threads issue processing operations to said resource circuitry;
    said step of issuing processing operations issues memory access processing operations to a cache memory and said resource circuitry comprises miss tracking circuitry to store data tracking pending missed cache accesses to said cache memory; and
    said step of re-execution queue circuitry stores data specifying memory access processing operations that have missed in said cache memory and that are unable to be tracked by said miss tracking circuitry.

2. A method of processing data comprising:
    perform processing operations with resource circuitry as part of executing said plurality of threads;
    issuing processing operations that use said resource circuitry; and
    storing within re-execution queue circuitry data specifying processing operations not able to be issued to said resource circuitry so as to permit further processing operations not requiring use of said resource circuitry to be issued from said issuing circuitry, wherein
    said issuing includes issuing memory access processing operation to a cache memory,
    said resource circuitry includes miss tracking circuitry to store data that tracks pending missed cache accesses to said cache memory, and
    said storing includes storing data specifying memory access processing operations that have missed in said cache memory and that are unable to be tracked by said miss tracking circuitry.

3. Apparatus for executing a plurality of threads in parallel, said apparatus comprising:
    resource circuitry to perform processing operations as part of executing said plurality of threads;
    scheduling circuitry to schedule issue of processing operations from said plurality of threads to said resource circuitry;
    issuing circuitry to issue processing operations that use said resource circuitry; and
    re-execution queue circuitry to store data specifying processing operations not able to be issued to said resource circuitry so as to permit further processing operations not requiring use of said resource circuitry to be issued from said issuing circuitry;
    wherein:
    said scheduling circuitry is responsive to a saturation signal indicative of a current capacity of said resource circuitry to perform processing operations issued to said resource circuitry to select a scheduling algorithm used to select which of said plurality of threads issue processing operations to said resource circuitry;
    said issuing circuitry is load/store unit circuitry to issue memory access processing operations to a cache memory and said resource circuitry comprises miss tracking circuitry to store data tracking pending missed cache accesses to said cache memory; and
    said re-execution queue circuitry is configured to store data specifying memory access processing operations that have missed in said cache memory and that are unable to be tracked by said miss tracking circuitry.

4. Apparatus as claimed in claim 3, wherein said plurality of threads form a thread group and each thread of said thread group executes a common program.

5. Apparatus as claimed in claim 3, comprising a cache memory, wherein said resource circuitry comprises miss tracking circuitry to store data tracking pending missed cache accesses to said cache memory and said saturation signal indicates remaining capacity of said miss tracking circuitry to track additional pending missed cache accesses.

6. Apparatus as claimed in claim 5, comprising issue queue circuitry to store data specifying processing operations from said plurality of threads awaiting issue, wherein said issue queue circuitry provides a memory access instruction issue queue to queue memory access instructions awaiting issue and a computational instruction issue queue to queue computational instructions awaiting issue.

7. Apparatus as claimed in claim 3, wherein said saturation signal indicates whether or not said resource circuitry is able to accept any additional processing operations issued to said resource circuitry.

8. Apparatus as claimed in claim 3, wherein said first scheduling algorithm selects a processing operation to schedule from among all of said plurality of threads and said second scheduling algorithm selects a processing operation to schedule from a single active thread among said plurality of threads.

9. Apparatus as claimed in claim 8, wherein said scheduling circuitry switches which of said plurality of threads is said single active thread when a next processing operation to schedule from said single active thread is dependent upon a processing operation pending with said resource circuitry.

10. Apparatus as claimed in claim 9, wherein said further processing operations are memory access processing operations that hit within said cache memory.

11. Apparatus as claimed in claim 3, wherein said re-execution queue circuitry identifies a processing operation of a selected thread among said plurality of thread to be issue next from said re-execution queue circuitry, processing operations of said selected thread to be issued before processing operations from other threads of said plurality of threads.

12. Apparatus as claimed in claim 3, wherein said scheduling circuitry is configured to switch between a first scheduling algorithm used when said resource circuitry is able to accept processing operations and a second scheduling algorithm when said resource circuitry is not able to accept processing operations.

13. Apparatus for processing data comprising:
resource circuitry to perform processing operations as part of executing said plurality of threads; and
issuing circuitry to issue processing operations that use said resource circuitry and re-execution queue circuitry to store data specifying processing operations not able to be issued to said resource circuitry so as to permit further processing operations not requiring use of said resource circuitry to be issued from said issuing circuitry,
wherein said issuing circuitry is load/store unit circuitry to issue memory access processing operations to a cache memory and said resource circuitry includes miss tracking circuitry to store data that tracks pending missed cache accesses to said cache memory,
wherein said re-execution queue circuitry is configured to store data specifying memory access processing operations that have missed in said cache memory and that are unable to be tracked by said miss tracking circuitry.

14. Apparatus as claimed in claim 13, wherein said further processing operations are memory access processing operations that hit within said cache memory.

15. Apparatus as claimed in claim 13, wherein said re-execution queue circuitry identifies a processing operation of a selected thread among said plurality of thread to be issue next from said re-execution queue circuitry, processing operations of said selected thread to be issued before processing operations from other threads of said plurality of threads.

* * * * *